(12) United States Patent
Lee et al.

(10) Patent No.: US 7,808,696 B2
(45) Date of Patent: Oct. 5, 2010

(54) ELECTROPHORETIC DISPLAY DEVICE AND FABRICATION THEREOF

(75) Inventors: Woo Jae Lee, Yongin-si (KR); Seong Sik Shin, Seongnam-si (KR); Nam Seok Roh, Seongnam-si (KR); Keun Kyu Song, Gyeonggi-do (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 120 days.

(21) Appl. No.: 11/829,020

(22) Filed: Jul. 26, 2007

(65) Prior Publication Data

US 2008/0024432 A1 Jan. 31, 2008

(30) Foreign Application Priority Data

Jul. 31, 2006 (KR) .................. 10-2006-0072281
Mar. 5, 2007 (KR) .................. 10-2007-0021261

(51) Int. Cl.
*G02B 26/00* (2006.01)
*G09G 3/34* (2006.01)
*G03G 13/00* (2006.01)

(52) U.S. Cl. ................ 359/296; 345/107; 430/31
(58) Field of Classification Search .......... 359/296; 345/84–85, 107; 430/31–32; 347/111–112; 399/131; 204/600
See application file for complete search history.

(56) References Cited

U.S. PATENT DOCUMENTS 5,268,782 A * 12/1993 Wenz et al. .............. 349/156
2003/0038755 A1 2/2003 Amundson et al.
2003/0165016 A1 9/2003 Whitehead et al.
2004/0135763 A1 7/2004 Kaneko et al.
2004/0150325 A1 * 8/2004 Yamakita et al. ........... 313/498
2005/0195470 A1 * 9/2005 Takeda .................. 359/296

FOREIGN PATENT DOCUMENTS

| CN | 1639625 A | 7/2005 |
| EP | 1501194 A1 | 1/2005 |
| JP | 2001296564 A | 10/2001 |
| JP | 2003121887 A | 4/2003 |
| JP | 2005024864 A | 1/2005 |
| JP | 2005275261 A | 10/2005 |
| WO | 03/075085 A1 | 9/2003 |

OTHER PUBLICATIONS

EP Search Report of Oct. 15, 2007.

* cited by examiner

*Primary Examiner*—Scott J Sugarman
*Assistant Examiner*—Dawayne A Pinkney
(74) *Attorney, Agent, or Firm*—Innovation Counsel LLP

(57) ABSTRACT

An electrophoretic display device having improved frontal reflectance includes a first substrate including a first electrode of a transparent material having a first optical pattern, a second substrate opposing the first substrate and including a plurality of second electrodes, a spacer interposed between the first and second substrates to define a space between the first and second substrates, and a image display layer formed in the space formed by the first and second substrates and the spacer to display an image by an electric field generated between the first and second electrodes.

20 Claims, 13 Drawing Sheets

ELECTROPHORETIC DISPLAY DEVICE AND FABRICATION THEREOF

CROSS REFERENCE TO RELATED APPLICATIONS

This application claims priority to Korean Patent Applications Nos. 2006-72281 and 2007-21261 filed respectively on Jul. 31, 2006 and Mar. 5, 2007, and all the benefits accruing therefrom under 35 U.S.C. §119, and the contents of which in its entirety are herein incorporated by reference.

BACKGROUND OF THE INVENTION

1. Field of the Invention

The present invention relates to an electrophoretic display device and, more particularly, to an electrophoretic display device having improved frontal reflectance.

2. Description of the Related Art

An electrophoretic display device displays visible images by arranging charged pigment particles dispersed in a liquid medium with an applied electric field.

FIG. 1 is a cross sectional view illustrating a conventional electrophoretic display device. As shown in FIG. 1, an electrophoretic display device 1 is implemented with two facing substrates 10 and 20 on which electrodes 12 and 22 are respectively formed. An image display layer 40 is formed between the two substrates 10 and 20. The image display layer 40 includes an insulating material 42, and electrophoretic particles 44 and 46 possessing different electric charges dispersed in the insulating material 42. The electric field applied between electrodes 12 and 14 moves the oppositely polarized electrophoretic particles 44 and 46 in different directions, thereby displaying successive images. A background color which contrasts with that of the electrophoretic particle is carried by the insulating material.

Since the electrophoretic display device is fully reflective, it consumes less power than liquid crystal display devices, plasma display panels, and organic light emitting devices. Further, since the electrophoretic display device provides a paper-like display quality, eye fatigue is reduced.

In FIG. 1, the conventional electrophoretic display device 1 is implemented such that the charged particles are arranged over an inner surface of the electrode 12 formed on the substrate 10, for reflecting incident light from outside. Since the inner surface of the electrode 12 facing the charged particles is flat, the incident light approached at an incident angle $\theta_1$ is reflected at a reflection angle $\theta_2$ which is equal to the incident angle $\theta_1$. Accordingly, the conventional electrophoretic display device 1 does not totally reflect the incident light in a frontal direction with respect to the substrate 10.

For this reason, the conventional electrophoretic display device fails to provide as bright an image as is desired.

SUMMARY OF THE INVENTION

The present invention provides an electrophoretic display device with an optical pattern which is capable of enhancing frontal reflectance and a method for fabricating such electrophoretic display device.

In an exemplary embodiment of the present invention, an electrophoretic display device includes a first substrate including a first electrode of a transparent material having a first optical pattern for improving reflectance; a second substrate opposing the first substrate and including a second electrode; a spacer interposed between the first and second substrates to define a space between the first and second substrates; and an image display layer formed in the space formed by the first and second substrates and the spacer to display an image by an electric field generated between the first and second electrodes. In some embodiments the first optical pattern may be a convex or concave shape.

In some embodiments the first substrate includes a transparent substrate; a pattern layer formed on the transparent substrate and having a second pattern corresponding to the first optical pattern; wherein the first electrode is formed along the second pattern.

In some embodiments, the first electrode is provided with a spacer-inserting groove into which one end of the spacer is tightly inserted and wherein the spacer-inserting groove is formed at a boundary of the first optical pattern.

In some embodiments, the image display layer includes an dielectric fluid filled in the space formed by the first and second substrates and the spacer; white-colored charged particles dispersed in the dielectric fluid; and non-white-colored charged particles dispersed in the dielectric fluid, wherein the white-colored charged particles and the non-white-colored charged particles have different polarities. In some embodiments, the dielectric fluid may be gas or liquid.

In some embodiments, the image display layer may be Electronic Liquid Powder.

In some embodiments, the image display layer includes a plurality of capsules disposed in the space between the first and second substrates and the spacer; an dielectric fluid filled in the capsules; white-colored charged particles dispersed in the dielectric fluid; and non-white-colored charged particles dispersed in the dielectric fluid, wherein the white-colored charged particles and the non-white-colored charged particles have different polarities.

In some embodiments, the capsules have upper walls curved so as to be tightly fitted to the first optical pattern of the first electrode.

In some embodiments, the image display layer includes a plurality of capsules disposed in the space between the first and second substrates and the space; and electronic liquid powder filled in the capsules.

In some embodiments, the first optical pattern may be formed with at least one of concave or convex shapes on unit pixel basis.

In some embodiments, the concave shape may be at least one of a concave lens shape, a concaved cone shape, or a concaved polygonal pyramid shape.

In some embodiments, the convex shape may be at least one of a convex lens shape, a convex cone shape, or a convex polygonal pyramid shape.

In some embodiments, the first electrode may be provided with a spacer-inserting groove into which one end of the spacer is tightly inserted and wherein the spacer-inserting groove is formed at a boundary of the first optical pattern.

In some embodiments, the image display layer may include an dielectric fluid filled in the space formed by the first and second substrates and the spacer; white-colored charged particles dispersed in the dielectric fluid; and non-white-colored charged particles dispersed in the dielectric fluid, wherein the white-colored charged particles and the non-white-colored charged particles have different polarities.

In some embodiments, the image display layer may include a plurality of capsules disposed in the space between the first and second substrates and the spacer; an dielectric fluid filled in the capsule; white-colored charged particles dispersed in the dielectric fluid; and non-white-colored charged particles dispersed in the dielectric fluid, wherein the white-colored charged particles and the non-white-colored charged particles have different polarities.

In an exemplary embodiment of the present invention, an electrophoretic display device includes a first substrate including a first electrode of a transparent material having a first optical pattern for improving frontal reflectance; a second substrate opposing the first substrate and including a second electrode; and an image display layer formed in a space formed by the first and second substrates to display an image according to an electric field applied between the first and second electrodes, wherein the image display layer includes a plurality of capsules disposed in the space between the first and second substrates and the spacer; a dielectric fluid filled in the capsules; white-colored charged particles dispersed in the dielectric fluid; and non-white-colored charged particles dispersed in the dielectric fluid, wherein the white-colored charged particles and the non-white-colored charged particles have different polarities.

In some embodiments, the capsules are formed of a soft material such that the upper walls of the capsules are tightly fitted to the first optical pattern of the first electrode by a press force of the fist substrate and the second substrate.

In an exemplary embodiment of the present invention, a method of fabricating an electrophoretic display device includes forming an optical pattern on one surface of a first substrate; forming a first electrode of a transparent material along the optical pattern on the surface of the first substrate on which the optical pattern is formed; forming a second electrode of a transparent material on a surface of a second substrate; patterning a spacer on the second substrate; forming an image display layer on the second substrate; and bonding the first substrate and the second substrate such that the image display layer is interposed between the first and second substrates.

In some embodiments, the forming the optical pattern includes depositing an organic layer on the surface of the first substrate; and forming the optical pattern by patterning the organic layer using a photolithography process.

In some embodiments, the forming the optical pattern uses an imprint or photolithography process.

In some embodiments, the image display layer is formed by depositing electronic liquid powder in a space formed by the first and second substrates and the spacer.

In an exemplary embodiment of the present invention, a method of forming an optical pattern on one surface of a first substrate; forming a first electrode of a transparent material along the optical pattern on the surface of the first substrate on which the optical pattern is formed; forming a second electrode of a transparent material on a surface of a second substrate; forming an image display layer on the second substrate; and bonding the first substrate and the second substrate such that the image display layer is interposed between the first and second substrates, wherein the image display layer includes a plurality of capsules disposed in a space between the first and second substrates and the spacer; a dielectric fluid filled in the capsules; white-colored charged particles dispersed in the dielectric fluid; and non-white-colored charged particles dispersed in the dielectric fluid, wherein the white-colored charged particles and the non-white-colored charged particles have different polarities.

In some embodiments, the capsules are formed of a soft material such that the upper walls of the capsules are tightly fitted to the first optical pattern of the first electrode by a press force of the fist substrate and the second substrate.

BRIEF DESCRIPTION OF THE DRAWINGS

The above and other features and advantages of the present invention will be more apparent from the following detailed description in conjunction with the accompanying drawings, in which.

DETAILED DESCRIPTION OF PREFERRED EMBODIMENTS

Exemplary embodiments of the present invention are described with reference to the accompanying drawings in detail. The same reference numbers will be used throughout the drawings to refer to the same or like parts. Detailed descriptions of well-known functions and structures incorporated herein may be omitted to avoid obscuring the subject matter of the present invention.

In the following detailed description, only the preferred embodiment has been shown and described, simply by way of illustration of the best mode contemplated by the inventors of carrying out the invention. As will be realized, the invention is capable of modification in various obvious respects, all with departing from the invention. Accordingly, the drawings and description should be regarded as illustrative in nature.

Figure 2:
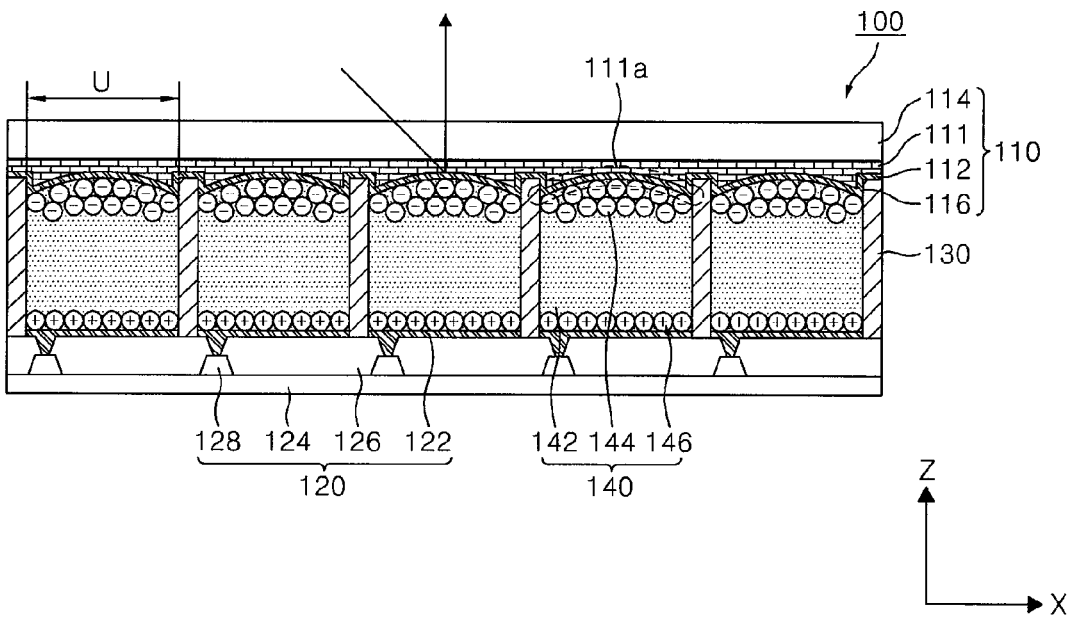
FIG. 2 is a cross-sectional view illustrating an electrophoretic display device according to a first exemplary embodiment of the present invention.

FIG. 2 is a cross-sectional view illustrating an electrophoretic display device according to a first exemplary embodiment of the present invention.

Referring to FIG. 2, an electrophoretic display device 100 includes a first substrate 110, a second substrate 120, a spacer 130, and an image display layer 140.

The first substrate 110 includes a transparent substrate 114, a pattern layer 111, and a first electrode 112 of a transparent electrode. The first substrate 110 may be a color filter substrate including a color filter (not shown).

The transparent substrate 114 and the first electrode 112 transmit incident light from outside to approach the image display layer 140 and reflect the incident light on the image display layer 140 toward a viewer (Z axis direction) with less loss. The pattern layer 111 is formed on the transparent substrate 114 and has a concave shape. The first electrode 112 includes an optical pattern 111a with a convex shape and a spacer-inserting groove 116 and acts as a common electrode. The optical pattern 111a with the convex shape corresponds to a concave pattern of the pattern layer 111. The pitch of each optical pattern 111a is determined according to the space between the spacers 130. The curvature of optical pattern 111a is designed to maximize the reflection of the incident light toward the frontal viewing direction.

The spacer-inserting groove 116 into which an upper end of the spacer 130 is inserted is formed at a boundary between unit pixels in the first electrode 112. In the case of forming the spacer-inserting groove 116, the surface of the first electrode 112 may be formed at a height below an upper end of the spacer 130. If the surface of the first electrode 112 is formed below the upper end of the spacer 130, no gap is created between an upper surface of the image display layer 140 and the first electrode 112. In this structure, the image display layer 140 is tightly fitted to the optical pattern 111a of the first electrode 112 so that the image display layer 140 has an upper surface of which contour is identical to the optical pattern of the first electrode 112. The curvature of the image display layer 140 increases the frontal reflectance of the incident light.

The term frontal reflectance means the amount of light reflected in a direction perpendicular to the surface of the first substrate 110, i.e. in a Z-axis direction toward a viewer. If the frontal reflectance is high, the brightness of the display device increases even in an identical ambient light environment.

The image display layer 140 is tightly fitted to the first electrode 112 by means of the spacer groove 116, decreasing the distance between the first electrode 112 and a second electrode 122 of a transparent electrode thereby lowering the required driving voltage and resulting in lower power consumption.

The second substrate 120 includes a transparent substrate 124, a thin film transistor 128, a protective layer 126, and the second electrode 122. The second substrate 120 is opposed to the first substrate 110. The second substrate 120 may be a thin film transistor substrate on which the thin film transistor 128 is arranged. The thin film transistor 128 is arranged on the transparent substrate 124 and acts as a switch for driving a unit pixel U independently. The protective layer 126 is formed on the thin film transistor 128.

The second electrode 122 is patterned on a unit pixel basis on the protective layer 126 and acts as a pixel electrode corresponding to the first electrode 112 acting as the common electrode. The second electrode 122 formed on the transparent substrate 124 is independently patterned per space defined by the spacers 130, unlike the first electrode 112.

The spacers 130 are interposed between the first and second substrates 110 and 120 so as to secure a certain distance between the first and second substrates 110 and 120. Each independent space formed between the first and second substrates 110 and 120 by the spacer 130 corresponds to the unit pixel U.

The image display layer 140 is filled in the space formed by the first and second substrates 110 and 120 and the spacer 130. The image display layer 140 is driven by an electric field generated between the first and second electrodes 112 and 122 so as to present an image.

The image display layer 140 may include an dielectric fluid 142, white-colored charged particles 144, and non-white-colored charged particles 146. The dielectric fluid 142 may be liquid or gas and is transparent so as to pass the light. The dielectric fluid 142 has a dielectric characteristic so as not to be influenced by the electric field.

The white-colored charged particles 144 are dispersed in the dielectric fluid 142 and are charged with a predetermined polarity charge. The white-colored charged particles 144 charged with negative or positive charges migrate to an electrode charged with opposite charges by an electric field formed when direct current voltages of different polarities are applied to the first and second electrodes 112 and 122. For example, if the white-colored charged particles 144 are negatively charged and a positive voltage is applied to the first electrode 112, the white-colored charged particles 144 migrate to the first electrode 112 so that the incident light is all reflected by the white colored charge particles 144. Then the electrophoretic display device displays white color.

The non-white-colored charged particles 146 are dispersed in the dielectric fluid 142 and have an opposite polarity to the white-colored charged particles 144. Since the non-white-colored charged particles 146 are charged in a polarity opposite to that of the white-colored charged particles 144, the non-white-colored charged particles 146 migrate to a direction opposite to that of the white-colored charged particles 144 when voltages are applied to the first and second electrodes 112 and 122. The non-white-colored charged particles 146 are typically colored by a black or blue dye. In case of implementing a color display device, the particles may be dyed by other color pigments.

In some embodiments, the image display layer 140 may be implemented with Electronic Liquid Powder. Electronic Liquid Powder is a display material developed by Bridgestone, a Japanese corporation and is called liquid-like powder. Electronic Liquid Powder is solid powder having the properties of liquid. Electronic Liquid Powder is extremely sensitive to electricity and has colors such that when a voltage is applied, it moves in the air to display an image. Since Electronic Liquid Powder can move in the air by using the air as a medium, it is easy to implement a display device with Electronic Liquid Powder. Electronic Liquid Powder, if it is used as the image display layer of the present invention, does not create a gap which may occur between the image display layer 140 and the first electrode 112 of the first substrate 110.

Figure 3:
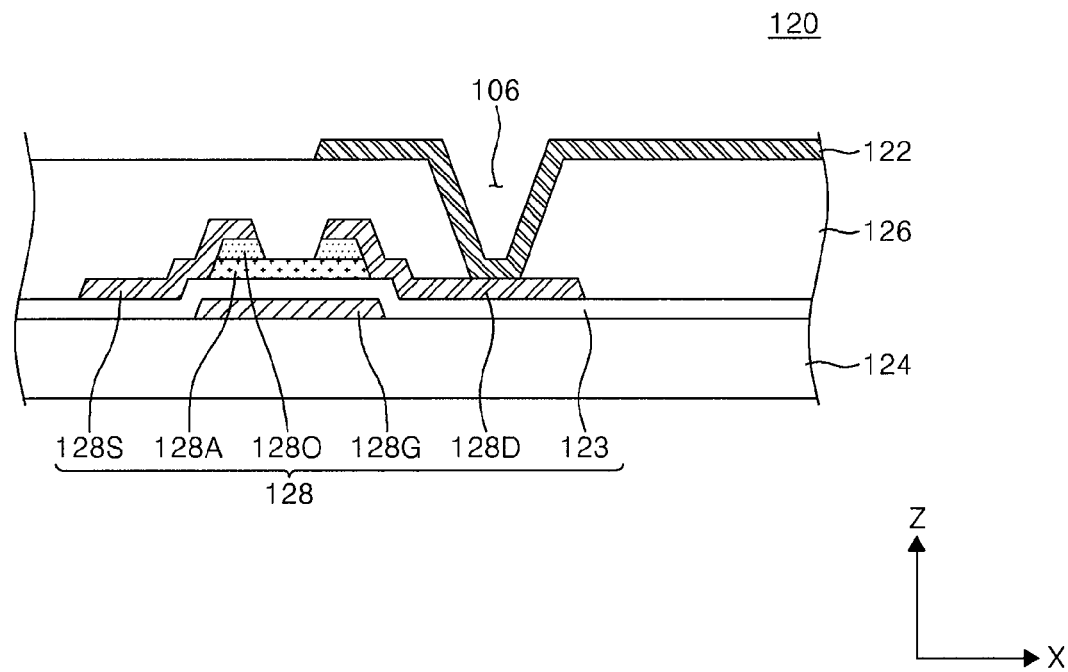
FIG. 3 is a cross-sectional view illustrating a second substrate shown in FIG. 2.

FIG. 3 is a cross-sectional view illustrating the second substrate 120 shown in FIG. 2. Referring to FIG. 3, the thin film transistor 128 formed on the second substrate 120 includes a gate electrode 128G, a gate insulation layer 123, an active layer 128A, an ohmic contact layer 1280, a source electrode 128S, and a drain electrode 128D. The drain electrode 128D of the thin film transistor 128 is connected to the second electrode 122 through a contact hole 106 of the protective layer 126.

The gate electrode 128G is connected to a gate line (not shown) and is supplied with a driving voltage from the gate line. The gate insulation layer 123 insulates the gate electrode 128G from the source and drain electrodes 128S and 128D and insulates the gate electrode 128G from the active layer 128A. The active layer 128A overlaps the gate electrode 128G with the gate insulation layer 123 interposed therebetween to form a channel between the source electrode 128S and the drain electrode 128D.

The ohmic contact layer 128O may be further formed on the active layer 128A. The ohmic contact layer 128O reduces a contact resistance between the source or drain electrode 128S or 128D and the active layer 128A to improve a characteristic of the thin film transistor 128. The source electrode 128S is connected to the one end of the active layer 128A through the ohmic contact layer 128O and is connected to a data line (not shown) in order to be provided with a gray display voltage from the data line. The drain electrode 128D is connected to another end of the active layer 128A while facing the source electrode 128S and is connected to the second electrode 122. In this case, the gray display voltage means a voltage corresponding gray of a data.

Figure 1:
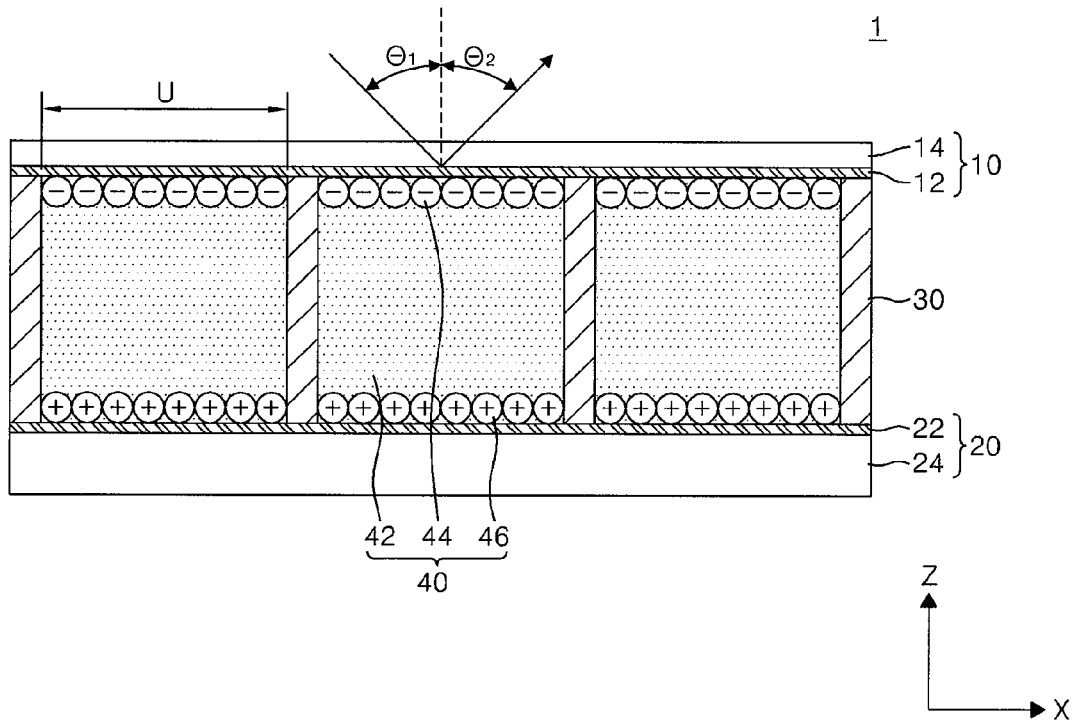
FIG. 1 is a cross-sectional view illustrating a conventional electrophoretic display device.

The protective layer 126 is formed over the thin film transistor 128 to protect the thin film transistor 128. The protective layer 126 includes the contact hole 106 which exposes one portion of the drain electrode 128D in order to connect the drain electrode 128D and the second electrode 122. The second electrode 122 is supplied with a gray display voltage from the drain electrode 128D and generates the electric field together with the first electrode 112 of the first substrate 110 shown in FIG. 1. The generated electric field moves the white-colored charged particles 144 and the non-white-colored charged particles 146 in a predetermined direction and displays an image.

Figure 4:
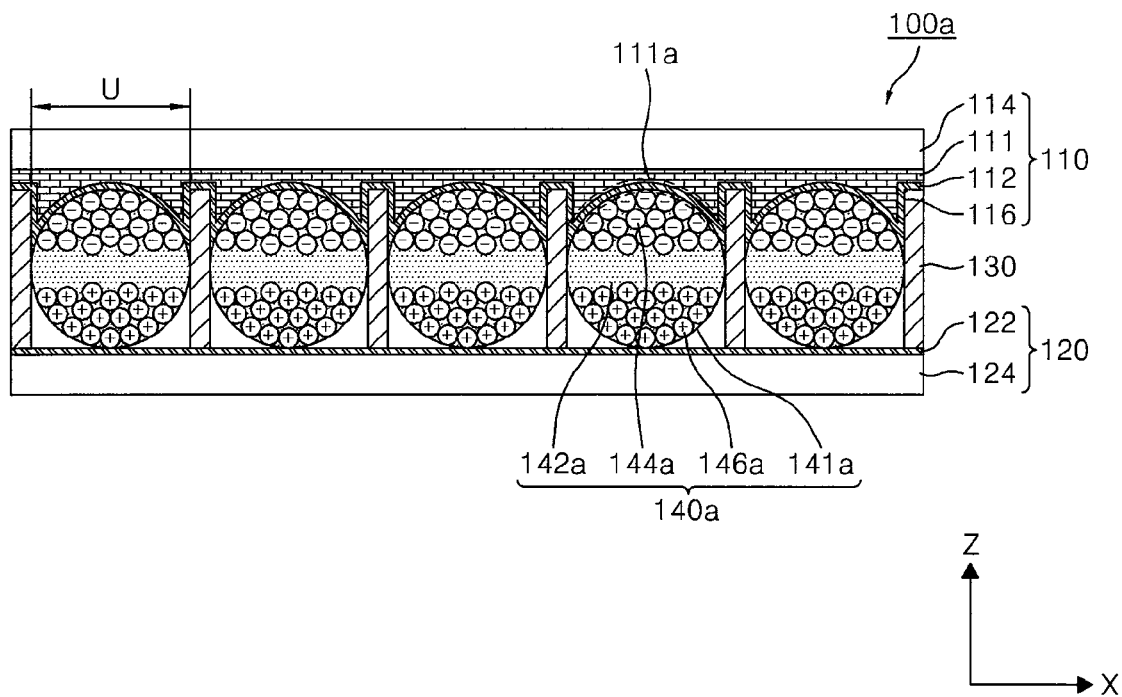
FIG. 4 is a cross-sectional view illustrating a modification of the electrophoretic display device of FIG. 2.

FIG. 4 is a cross-sectional view illustrating a modification of the electrophoretic display device of FIG. 2.

As shown in FIG. 4, the image display layer 140a may include a capsule 141a, a dielectric fluid 142a, white-colored charged particles 144a, and non-white-colored charged particles 146a. The capsule 141a is seated in a space defined by the spacer 130 and the first and second substrates 110 and 120 and secures movements of the white-colored charged particles 144a and non-white-colored charged particles 146a.

When the dielectric fluid is directly filled between the first and second substrates 110 and 120, sedimentation of the charged particles may occur and it is therefore advantageous to put the particles in capsules to prevent sedimentation of the charged particles as well as to improve a response speed of the image display layer 140a. The top surface of the capsule 141a is tightly fitted to the optical pattern of the curved surface of the first electrode 112. For this reason, the optical convex pattern of the first electrode 112 should be formed such that the convex curve is identical to a circumferential curve of the capsule 141a.

The capsule 141a is filled with the dielectric fluid 142a in which the white-colored charged particles 144a and the non-white-colored charged particles 146a are dispersed. Since the structure and function of the dielectric fluid 141a, the white-colored charged particles 144a, and the non-white-colored charged particles 146a are identical to the dielectric fluid 141, the white-colored charged particles 144, and the non-white-colored charged particles 146 shown in FIG. 2, a detailed description thereof is omitted.

In some embodiments, the capsule 141a may be implemented by filling the air and Electronic Liquid Powder.

Figure 12:
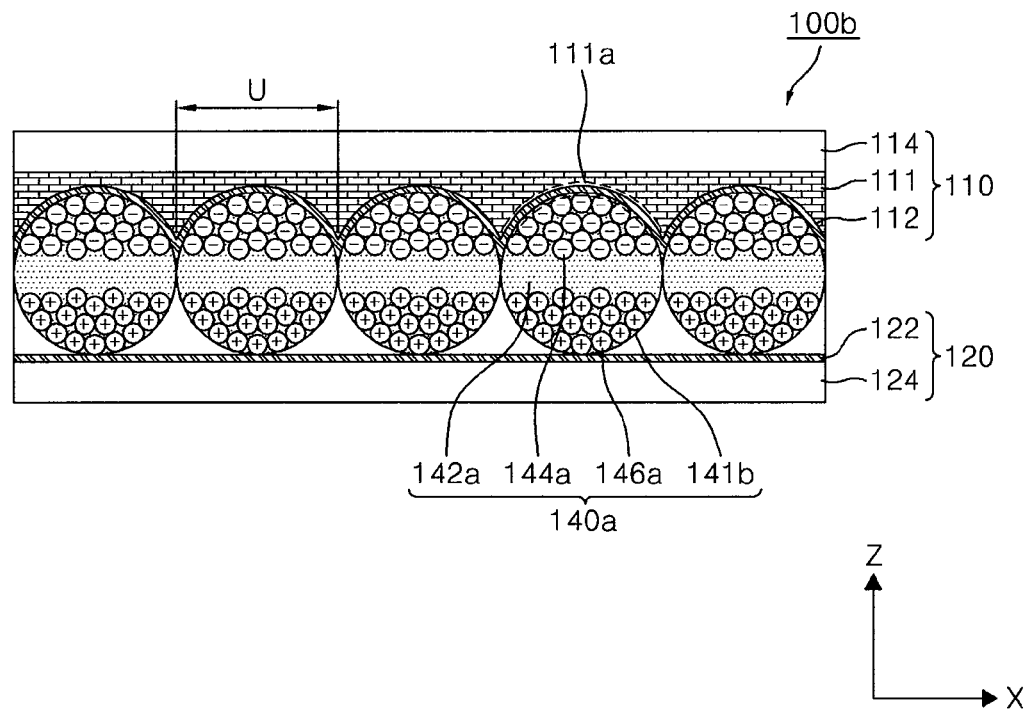
FIG. 12 is a cross-sectional view illustrating a modification of the electrophoretic display device of FIG. 4.

FIG. 12 is a cross-sectional view illustrating a modification of the electrophoretic display device of FIG. 4.

An electrophoretic display device 100b includes the same elements of FIG. 4 except that the spacer 130 is eliminated. Therefore, details of the same elements will be omitted in the following description.

As shown in FIG. 12, capsules 141b are formed with a spherical shape of a soft material. Therefore, when the capsules 141b are pressurized by the first substrate 110 and the second substrate 120, the upper walls of the capsules 141b are tightly fitted to the first optical pattern 111a of the first electrode 112. Alternatively, the capsules 141b are contacted each other.

Figure 5:
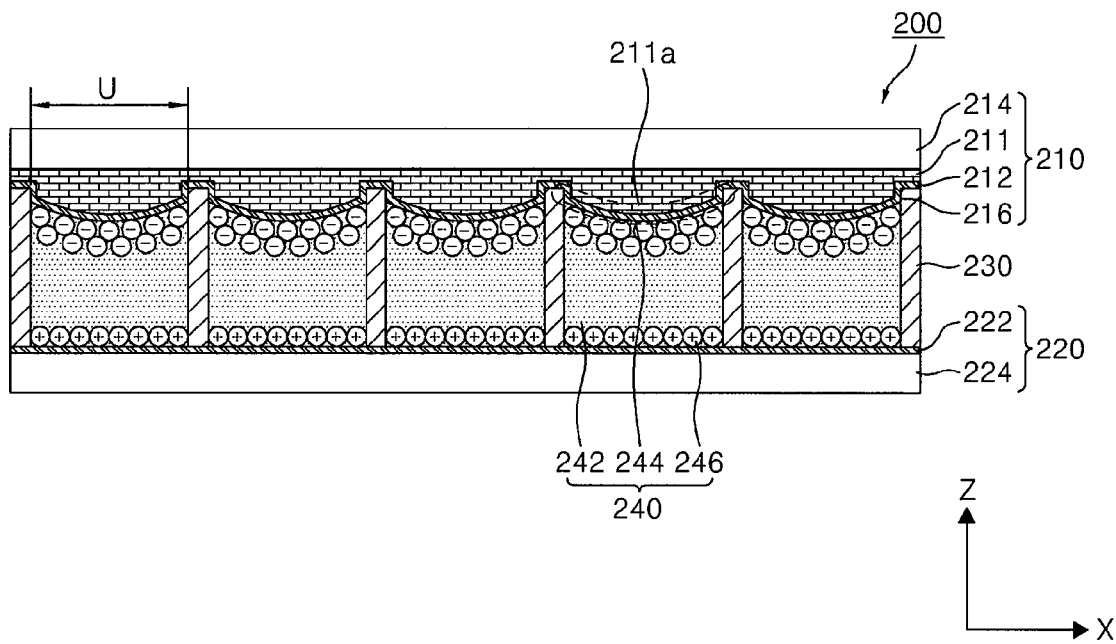
FIG. 5 is a cross-sectional view illustrating an electrophoretic display device according to a second exemplary embodiment of the present invention.

FIG. 5 is a cross-sectional view illustrating an electrophoretic display device according to a second exemplary embodiment of the present invention.

As shown in FIG. 5, an electrophoretic display device 200 includes a first substrate 210, a second substrate 220 opposing the first substrate 210, a spacer 230 interposed between the first and second substrates 210 and 220, and an image display layer 240.

The first substrate 210 includes a transparent substrate 214, a pattern layer 211, and a first electrode 212 of a transparent electrode. The first substrate 210 may be a color filter substrate which includes a color filter (not shown).

The pattern layer 211 is formed on the transparent substrate 214 having a convex pattern. The first electrode 212 includes a concave optical pattern 211a and a spacer-inserting groove 216 and acts as a common electrode. The concave optical pattern 211a corresponds to a convex pattern of the pattern layer 211.

The pitch of each concave optical pattern 211a is determined according to the area between the spacers 230. The curvature of the concave optical pattern 211a is designed to maximize the reflection of the incident light toward the frontal viewing direction (Z axis direction).

The spacer-inserting groove 216 into which an upper end of the spacer 230 is inserted is formed at a boundary between unit pixels U in the first electrode 212. In the case of forming the spacer-inserting groove 216, the surface of the first electrode 212 may be formed at a height below an upper end of the spacer 230.

The structures of the second substrate 220 including a second electrode 222 of a transparent electrode and a transparent substrate 224, the spacer 230 and the image display layer 240 are substantially the same as the second substrate 120, the spacer 130 and the image display layer 140 in FIG. 2. Therefore, a repetitive description will be omitted.

Figure 6:
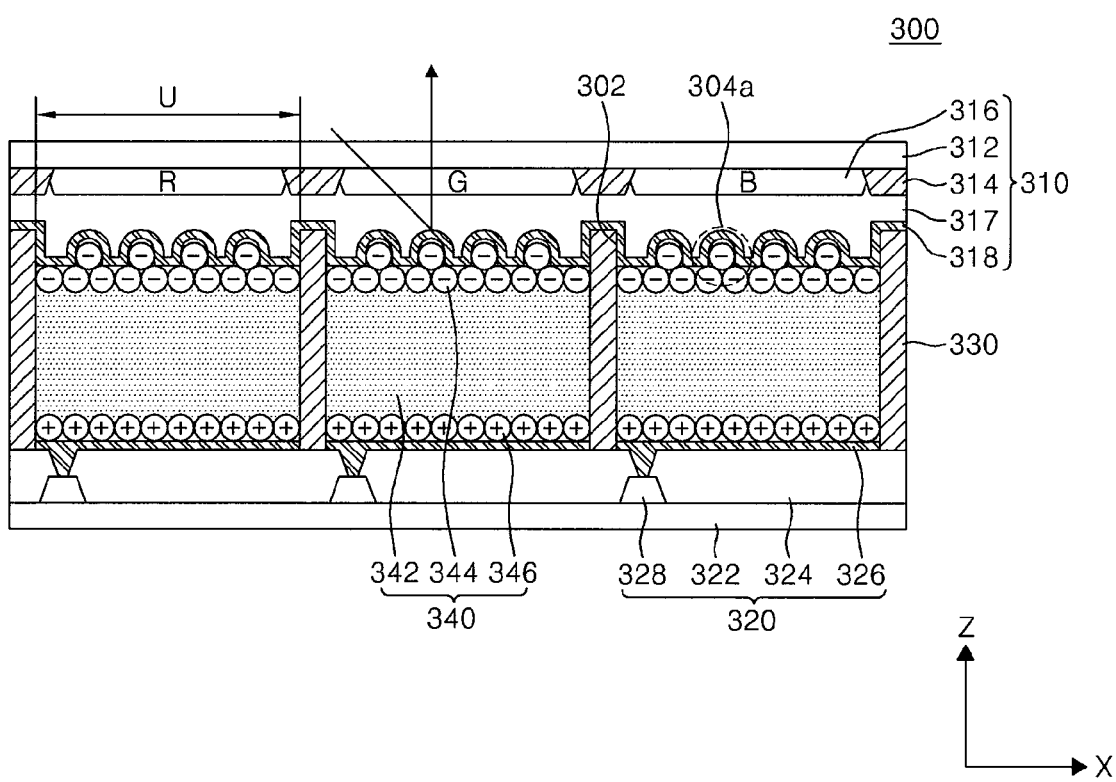
FIG. 6 is a cross-sectional view illustrating an electrophoretic display device according to a third exemplary embodiment of the present invention.

FIG. 6 is a cross-sectional view illustrating an electrophoretic display device according to a third exemplary embodiment of the present invention.

As shown in FIG. 6, an electrophoretic display device 300 includes a first substrate 310, a second substrate 320, a spacer 330, and an image display layer 340.

The first substrate 310 may be a color filter substrate which includes a transparent substrate 312, a black matrix 314, a color filter 316, an overcoat layer 317, and a first electrode 318 of a transparent electrode. The black matrix 314 is formed on the transparent substrate 312 in order to block off light between the unit pixels U. The color filter 316 realizes colors of the electrophoretic display device 300. The overcoat layer 317 has step coverage for good formation with the first electrode 318. The first electrode 318 is formed on the overcoat layer 317 and operates as a common electrode.

The transparent substrate 312 and transparent electrode 318 transmit incident light from outside to approach an image display layer 340 or reflect the incident light on the image display layer 340 with less loss. The transparent electrode 318 includes spacer-inserting grooves 302 and an optical pattern having a plurality of convex lens shapes 304a. The plurality of convex lens shapes 304a of the optical pattern corresponds to the concave lens shape patterns of the overcoat layer 317. The sizes of the convex lens shapes 304a of the optical pattern may be less than about 15 μm. The sizes of the convex lens shapes 304a of the optical pattern may be the same. The size of the convex lens shapes 304a of the optical pattern may be different and have random sizes within less than about 15 μm.

The random sizes of the convex lens shapes 304a of the optical pattern may be elected in a condition in which a reflection ratio is maximized.

The spacer-inserting groove 302 into which an upper end of the spacer 330 is inserted is formed at a boundary between the unit pixels U in the transparent electrode 318. In the case of forming the spacer-inserting groove 302, the surface of the transparent electrode 318 may be formed at a height below an upper end of the spacer 330.

Structures of the second substrate 320, the spacer 330, and the image display layer 340 are substantially the same as the second substrate 120, the spacer 130 and image display layer 140 in FIG. 2.

Figure 7:
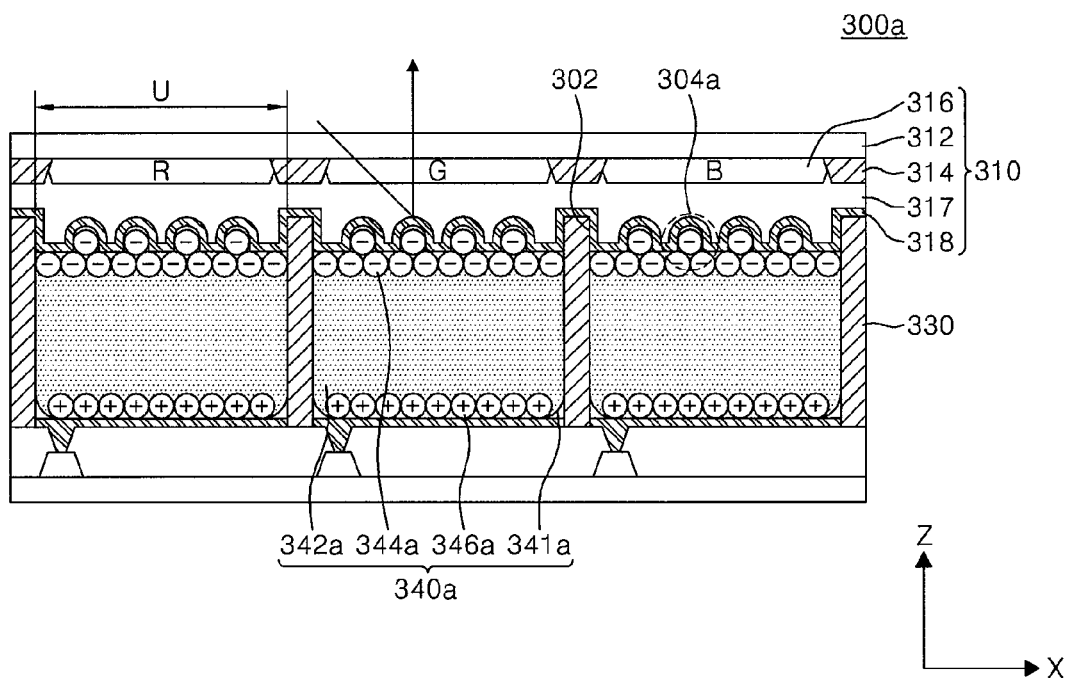
FIG. 7 is a cross-sectional view illustrating a modification of the electrophoretic display device of the FIG. 6.

FIG. 7 is a cross-sectional view illustrating a modification of the electrophoretic display device of FIG. 6.

As shown in FIG. 7, the image display layer 340a includes a capsule 341a, a dielectric fluid 342a, white-colored charged particles 344a, and non-white-colored charged particles 346a. The image display layer 340a has the same configuration as the image display layer 140a in FIG. 4.

Figure 13:
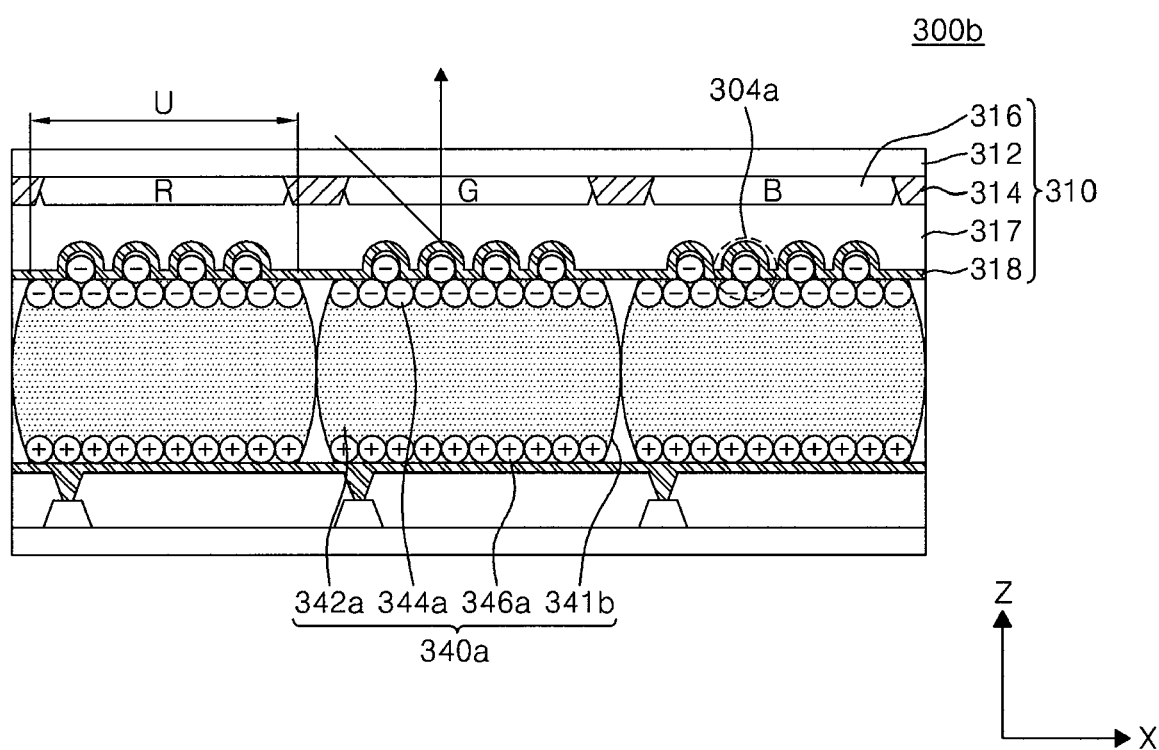
FIG. 13 is a cross-sectional view illustrating a modification of the electrophoretic display device of FIG. 7.

FIG. 13 is a cross-sectional view illustrating a modification of the electrophoretic display device of FIG. 7.

An electrophoretic display device 300b includes the same elements of FIG. 7 except that the spacer 330 is eliminated. Therefore, details of the same elements will be omitted in the following description.

As shown in FIG. 13, capsules 341b are formed with a spherical shape of a soft material. Therefore, when the capsules 141b are pressurized by the first and second substrates 310 and 320, the upper walls of the capsules 341b are tightly fitted to the plurality of convex lens shapes 304a of the optical pattern of the first electrode 318. Alternatively, the capsules 341b are contacted each other.

Figure 8A:
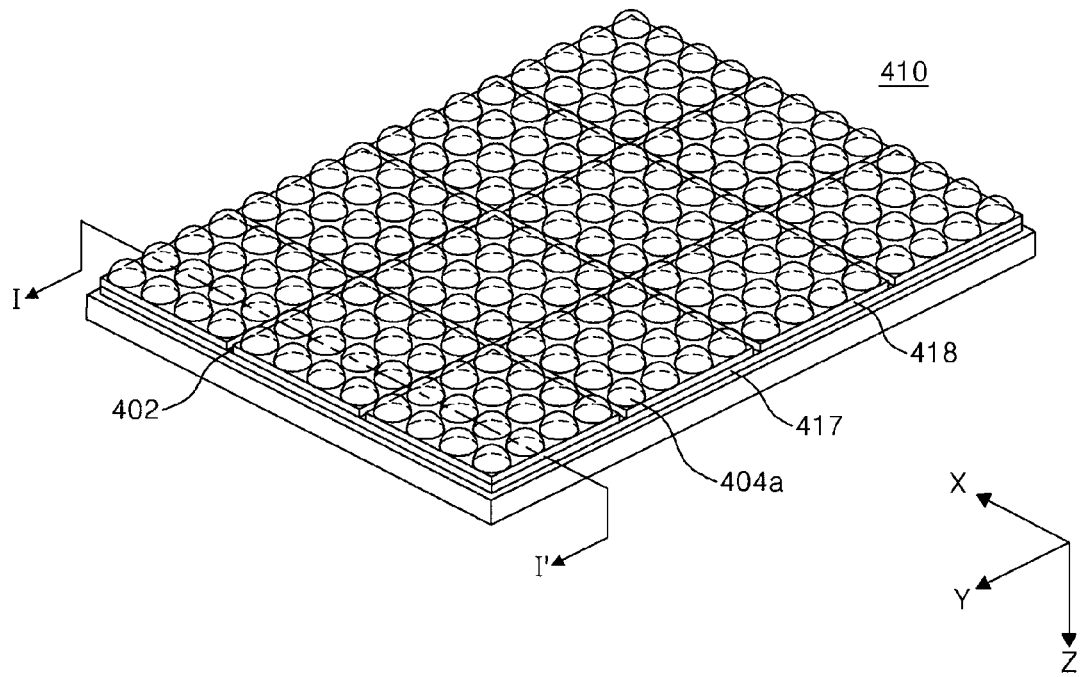
FIGS. 8A and 8B are perspective views illustrating a first substrate of an electrophoretic display device according to a fourth exemplary embodiment of the present invention.
Figure 8B:
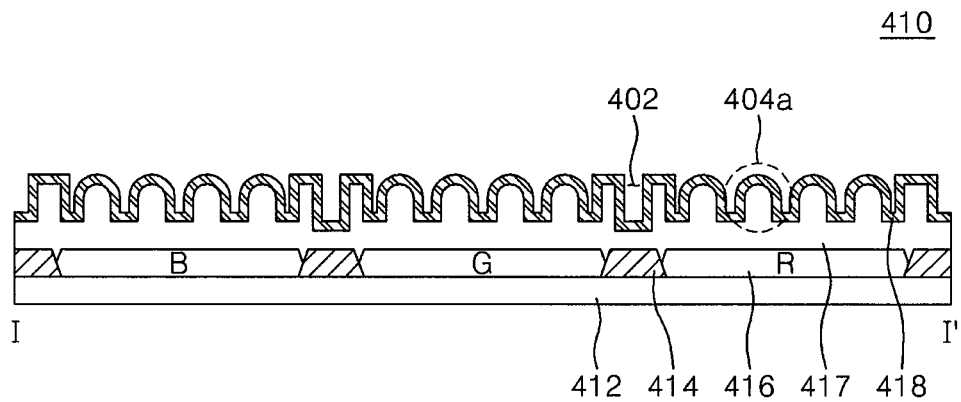
Figure 9A:
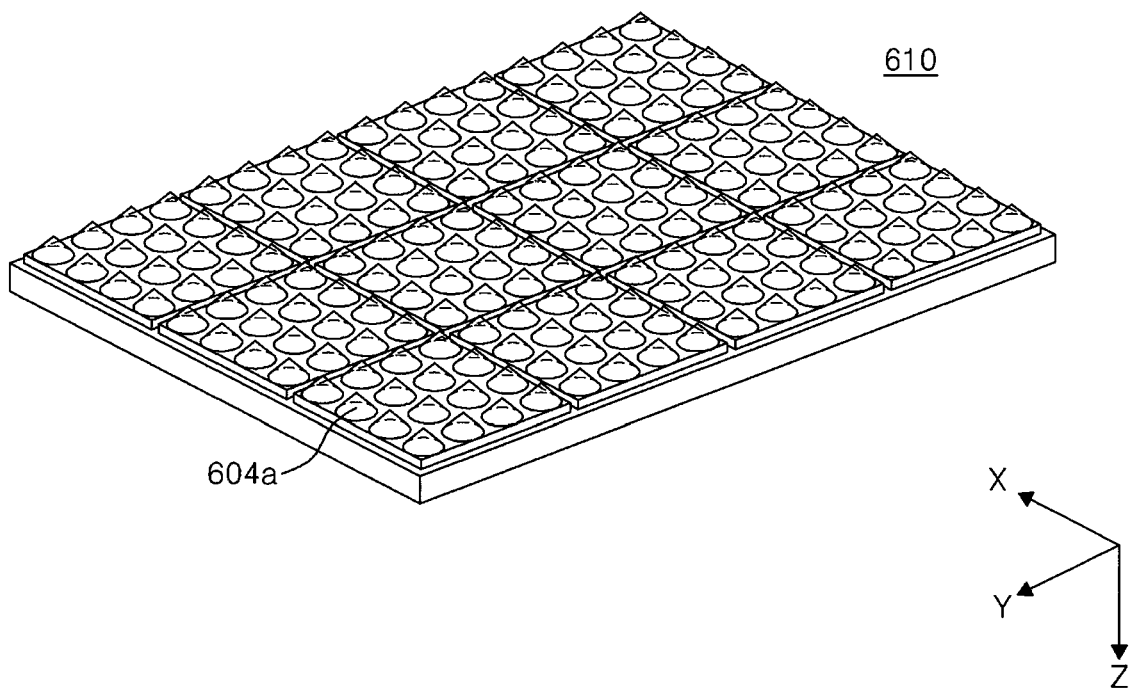
FIGS. 9A to 9E are perspective views illustrating optical patterns of the electrophoretic display device according to the fourth exemplary embodiment of the present invention.
Figure 9B:
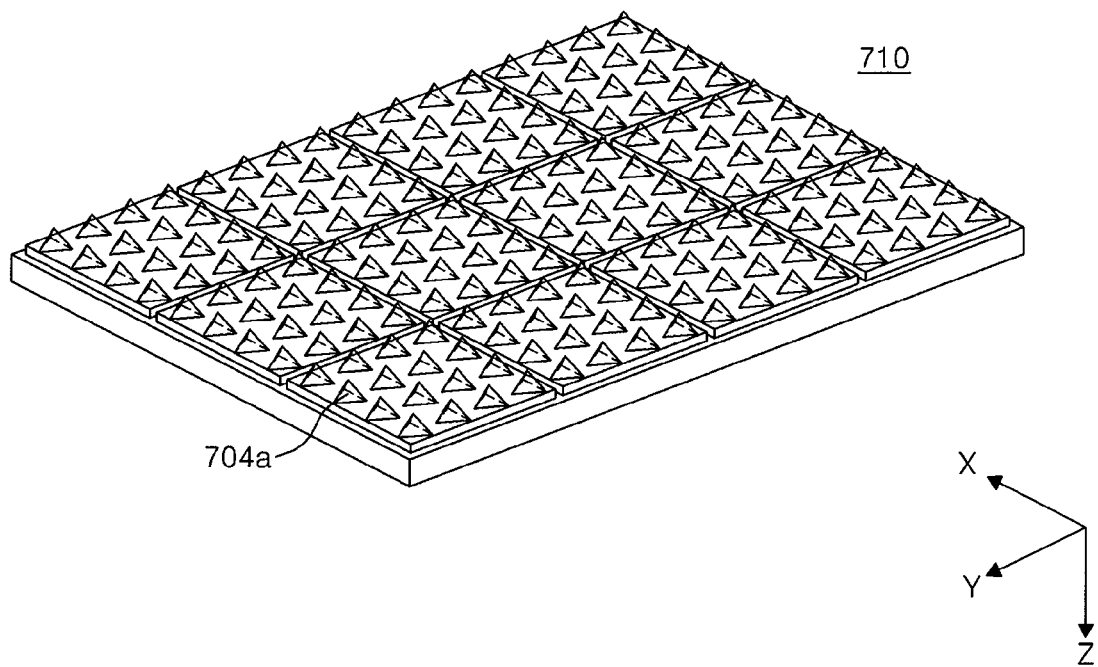
Figure 9C:
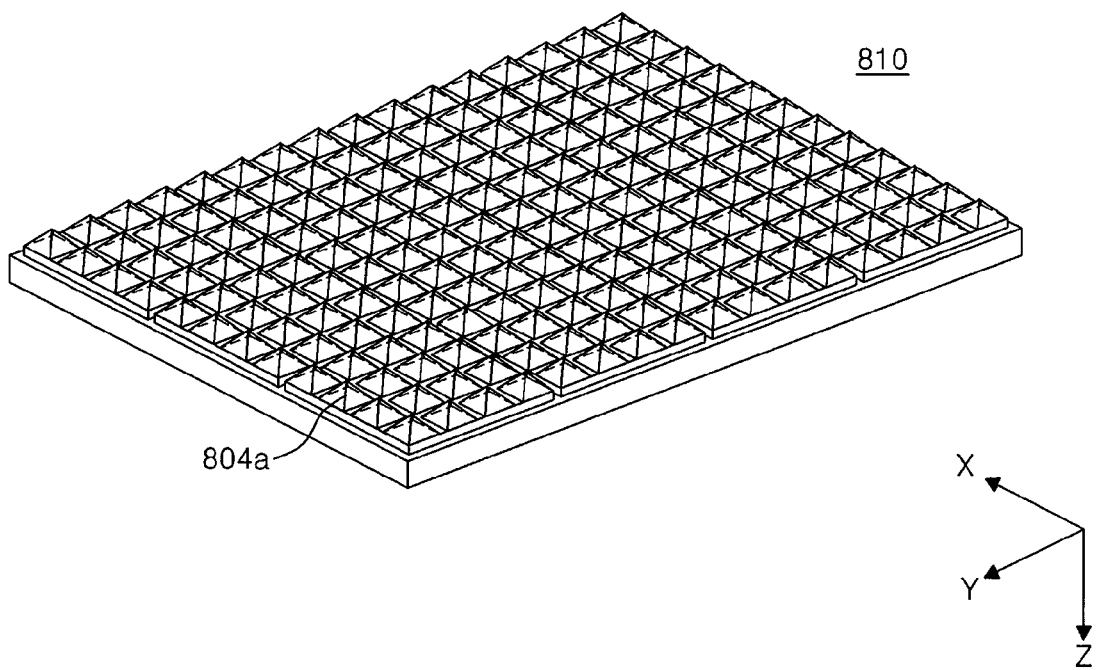
Figure 9D:
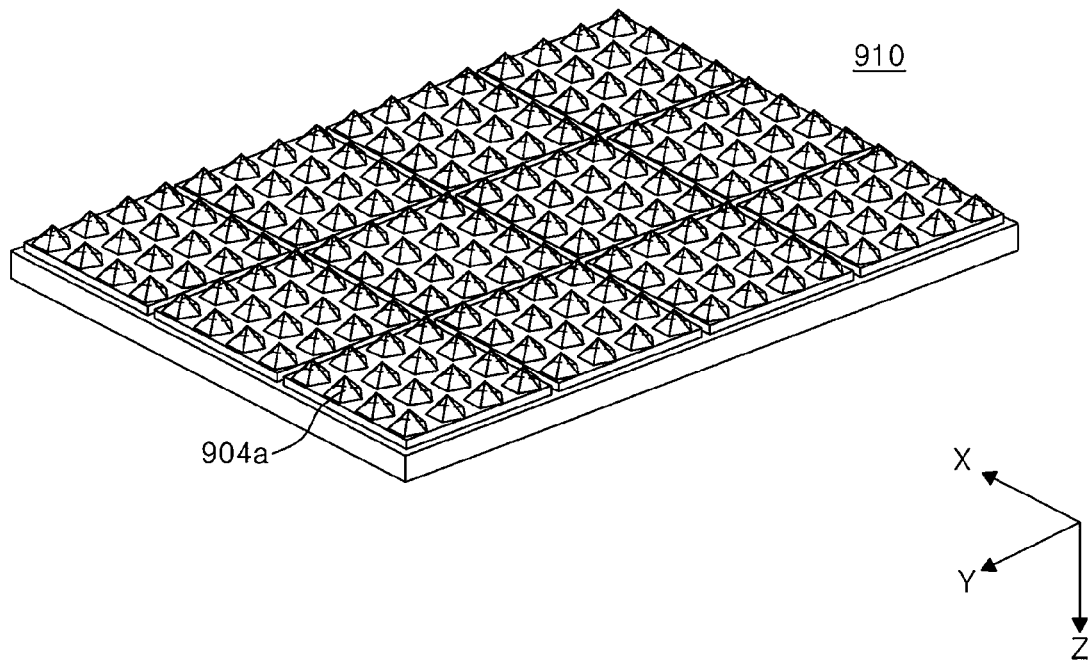
Figure 9E:
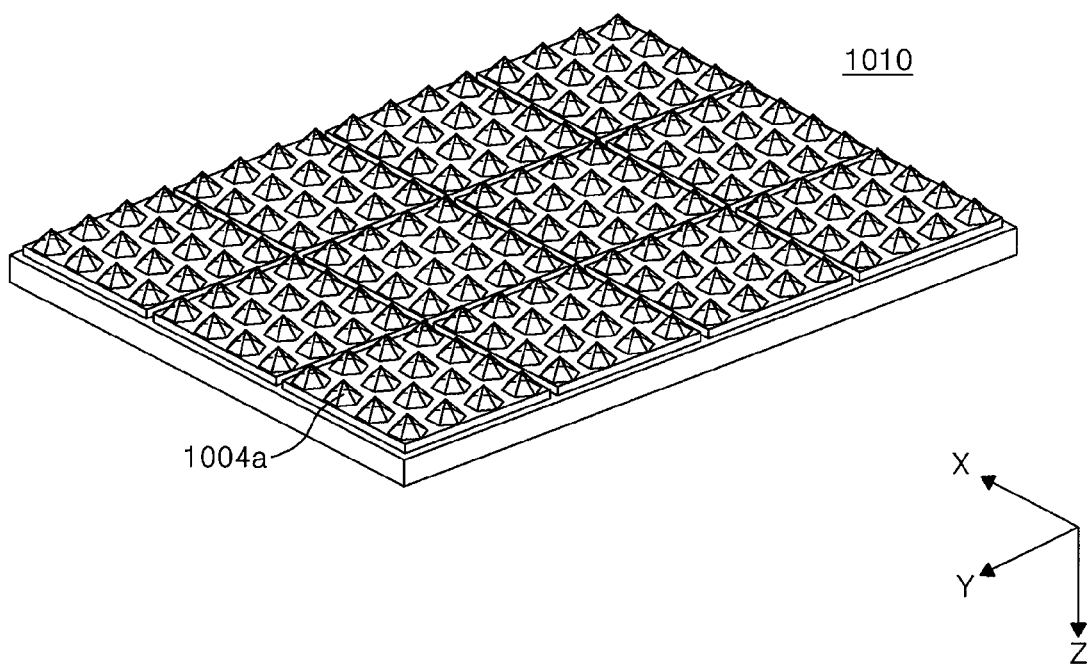

FIGS. 8A and 8B are perspective views illustrating a first substrate of an electrophoretic display device according to a fourth exemplary embodiment of the present invention.

As shown in FIGS. 8A and 8B, a first substrate 410 of an electrophoretic display device includes a transparent substrate 412, a black matrix 414, a color filter 416, an overcoat layer 417, and transparent electrode 418.

The transparent electrode 418 includes a spacer-inserting groove 402 and an optical pattern having a plurality of concave lens shapes 404a. The plurality of concave lens shapes 404a of the optical pattern corresponds to the convex lens shapes pattern of the overcoat layer 417. The size of the concave lens shapes 404a of the optical pattern may be less than about 15 μm. The size of the concave lens shapes 404a of the optical pattern may be the same. The size of the concave lens shapes 404a of the optical pattern may be different and have random size within less than about 15 μm. The random size of the concave lens shapes 404a of the optical pattern may be selected in a condition in which reflection efficiency is maximized.

The structures of the transparent substrate 412, the black matrix 414, the color filter 416, and the overcoat layer 417 are substantially the same as the transparent layer 312, the black matrix 314, the color filter 316, and the overcoat layer 317 in FIG. 6.

Although the first substrate of the electrophoretic display device having a convex or concave lens shape optical pattern has been explained, the optical pattern of the first substrate is not limited to the convex or concave shape lens. As shown in FIGS. 9A to 9E, the optical pattern formed in first substrates 610, 710, 810, 910 and 1010 may be, for example, a convex shape of a cone 604a, a trigonal pyramid 704a, a quadrangular pyramid 804a, a pentagonal pyramid 904a, and a hexagonal pyramid 1004a.

Figure 10A:
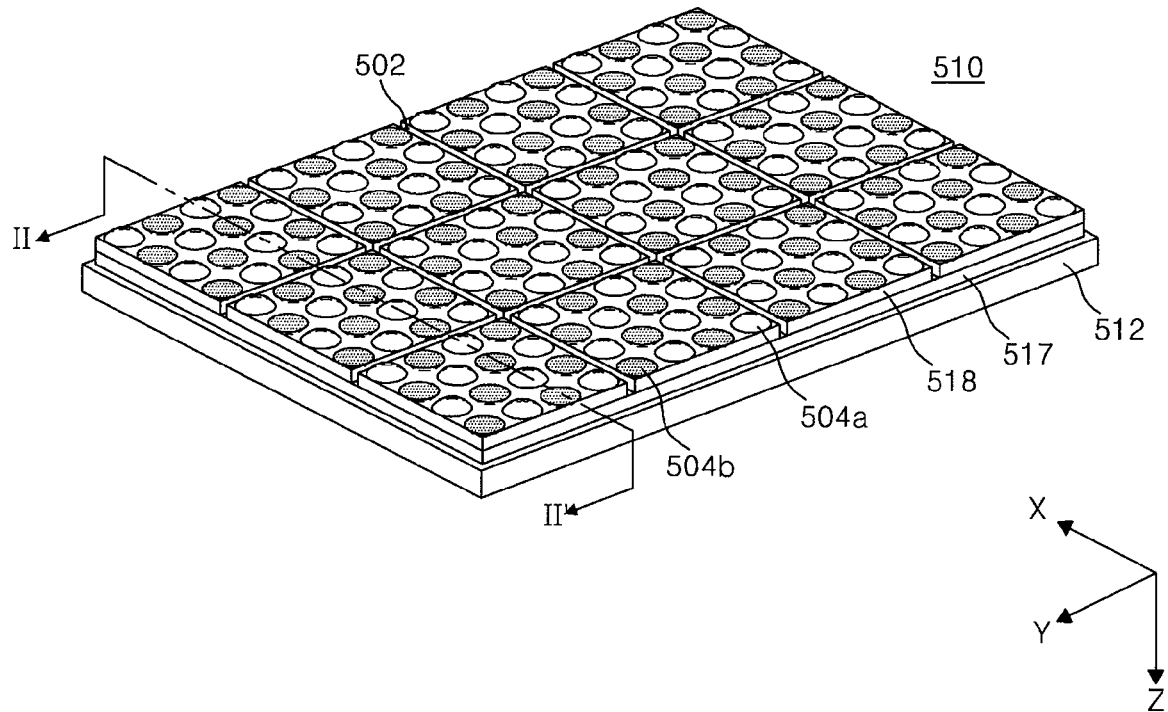
FIG. 10A is a perspective view illustrating another optical pattern of the electrophoretic display device according to the fourth exemplary embodiment of the present invention.

Alternately, the transparent electrode of the first substrate may have a mixed optical pattern of concave and convex lens shapes as shown in FIG. 10A.

Figure 10B:
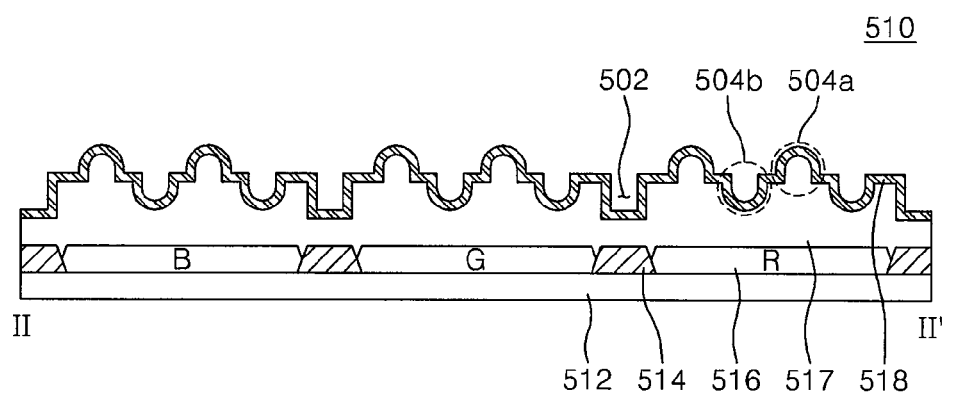
FIG. 10B is a cross-sectional view taken along line II-II' in FIG. 10A.

FIG. 10B is a cross-sectional view taken along line II-II' in FIG. 10A.

As shown in FIGS. 10A and 10B, a first substrate 510 includes a transparent substrate 512, a black matrix 514, a color filter 516, an overcoat layer 517, and a transparent electrode 518.

The transparent electrode 518 includes a spacer-inserting groove 502 and a mixed optical pattern which has a plurality of convex lens shapes 504a and concave lens shapes 504b. The mixed optical pattern corresponds to a concave and convex lens shape pattern of the overcoat layer 517.

The sizes of the plurality of convex lens shapes 504a and concave lens shapes 504b may be the same or different. The plurality of convex lens shapes 504a and concave lens shapes 504b may have random sizes within less than about 15 μm.

Structures of the transparent substrate 512, the black matrix 514, the color filter 516, and the overcoat layer 517 are similar to the transparent substrate 312, the black matrix 314, the color filter 316, and the overcoat layer 317 in FIG. 6. Although the optical pattern formed with a mixed shape of concave and convex lens shapes is explained, the optical pattern of the first substrate is not limited thereto. The mixed pattern may be formed with a combination of a cone, a trigonal pyramid, a quadrangular pyramid, a pentagonal pyramid, a hexagonal pyramid of concave or convex etc.

FIGS. 11A to 11G are views illustrating steps of fabricating an electrophoretic display device according to an exemplary embodiment of the present invention.

Figure 11A:
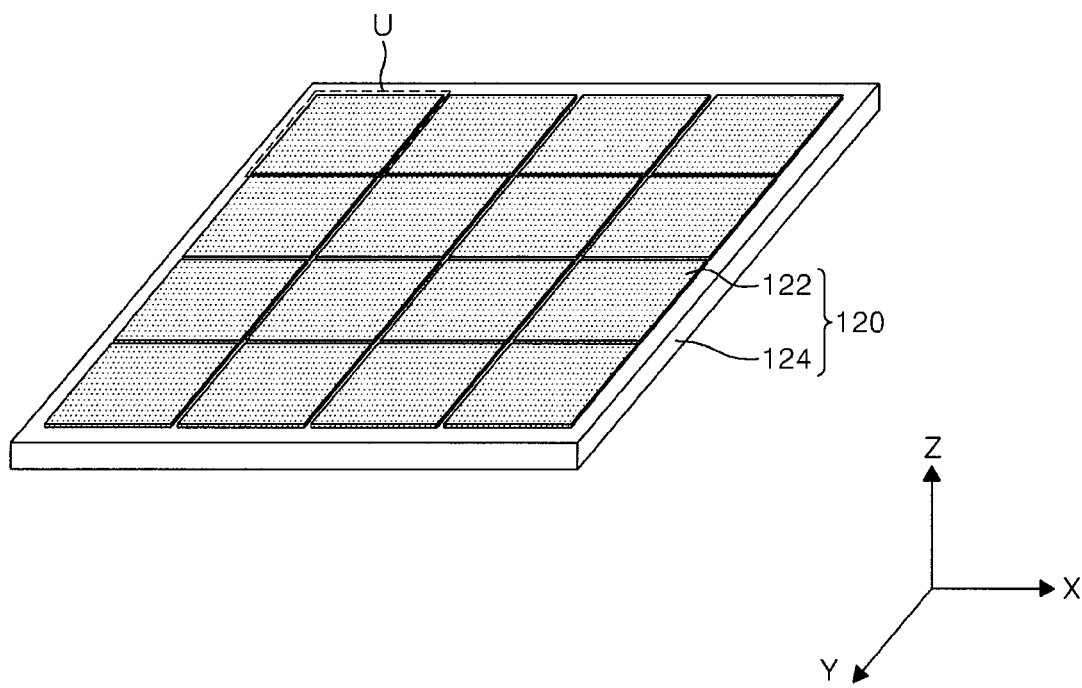
FIGS. 11A to 11G are views illustrating a process of fabricating the electrophoretic display device of FIG. 2.

As shown in FIG. 11A, the second electrode 122 is formed on the transparent substrate 124. A plurality of thin film transistors (not shown) as switching devices for determining timing and voltage levels to be applied is also formed on the transparent substrate 124. The thin film transistors are connected to the second electrodes 122.

The second electrode 122 is formed on the second substrate 124 with a predetermined pattern which corresponds to a spacer pattern to be formed on the transparent substrate 124 in a later process. That is, the second electrode 122 is formed on a unit pixel basis defined by the spacer 130.

Figure 11B:
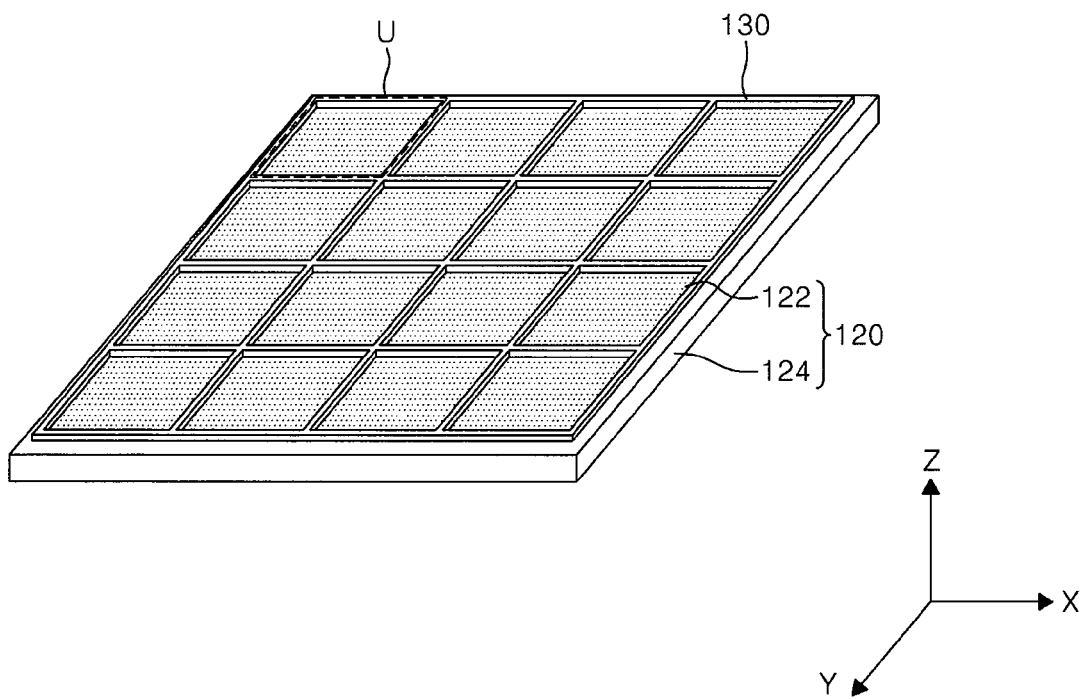

After the second electrode 122 is formed, as shown in FIG. 11B, a spacer pattern is formed on the second substrate 124. The spacer 130 is implemented in the form of a grid having a plurality of horizontal and vertical walls crossing each other so as to form a plurality of unit pixels. Then a cube space opened upwardly is formed by the spacer 130 and the second substrate 120.

Figure 11C:
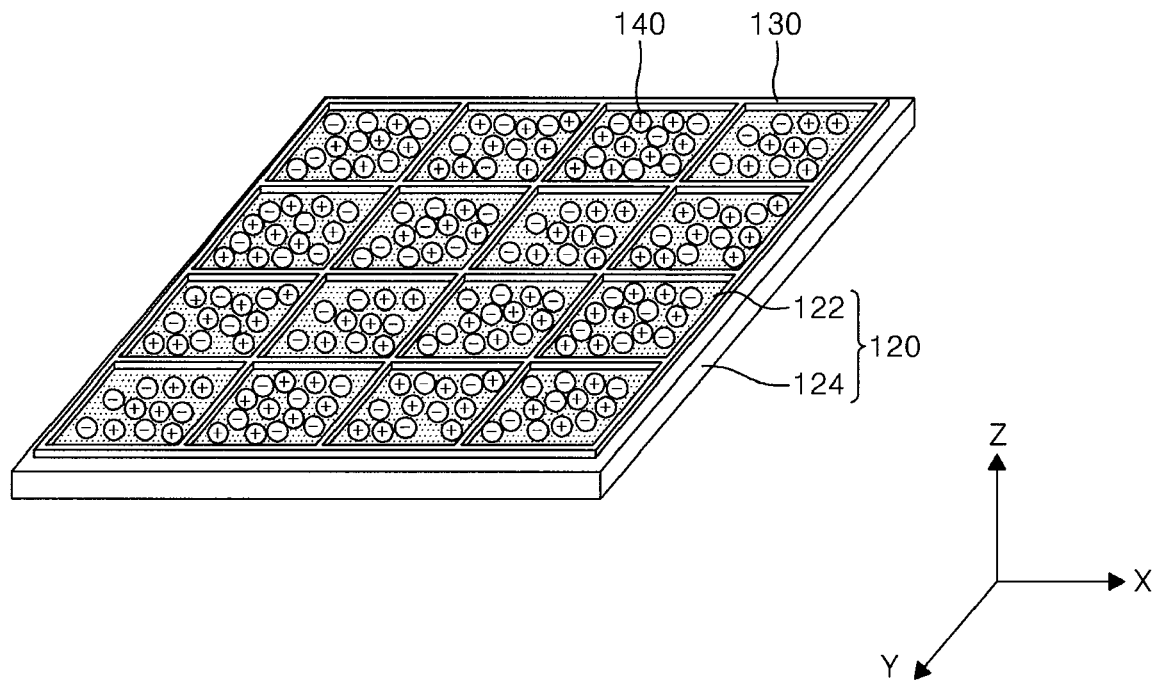

As shown in FIG. 11C, the image display layer 140 is formed in the unit pixel defined by the spacer 130 and the second substrate 120. The image display layer 140 may consist of an dielectric fluid, white-colored charged particles, and non-white-colored charged particles or may be implemented with Electronic Liquid Powder. In some embodiments, the image display layer 140 may be capsules filled with the dielectric fluid, white-colored charged particles, and non-white-colored particles.

An optical pattern with a curved shape is formed on the surface of the first substrate 110.

Figure 11D:
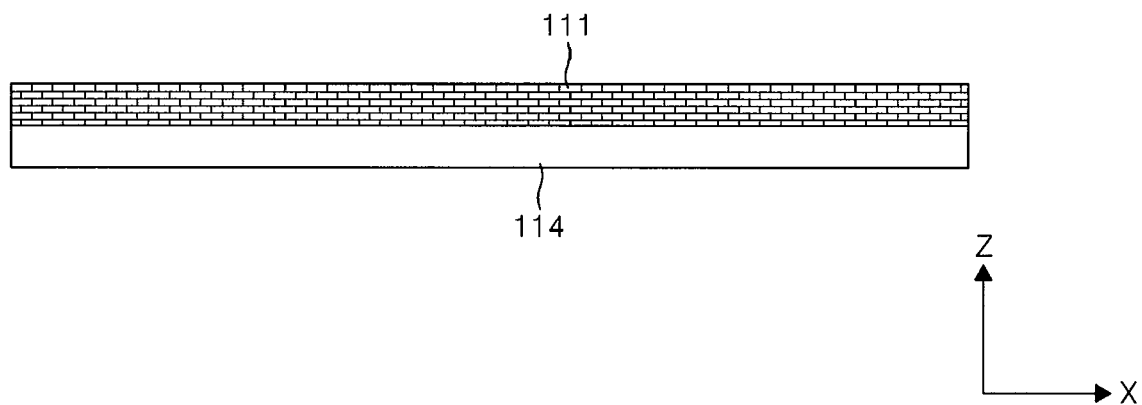

As shown in FIG. 11D, an organic layer 111 with a predetermined thickness is formed on the transparent substrate 114.

Figure 11E:
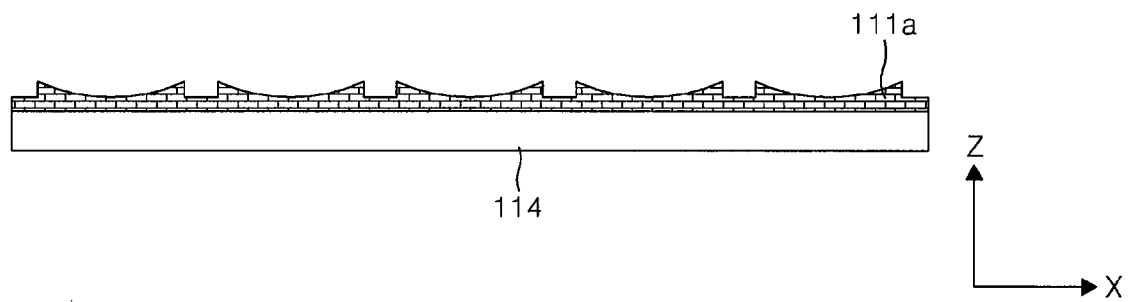

After the organic layer 111 is formed, as shown in FIG. 11E, the organic layer 111 is patterned to form an optical pattern 111a having a curved shape. The optical pattern 111a may be formed using a photolithography process or an imprint process. In the case of using the imprint process, a thermosetting or ultraviolet setting organic material is deposited on the transparent substrate 114 to form the optical pattern 111a by using a mold having a shape opposite to the optical pattern 111a. While the mold is pressed on the organic layer 111, heat or ultraviolet ray is applied to the transparent substrate 114. Thereafter, when the mold is removed, the concave pattern 111a is formed on the transparent substrate 114. Using the imprint process, the optical pattern may be simply formed rather than using the photolithography process.

Figure 11F:
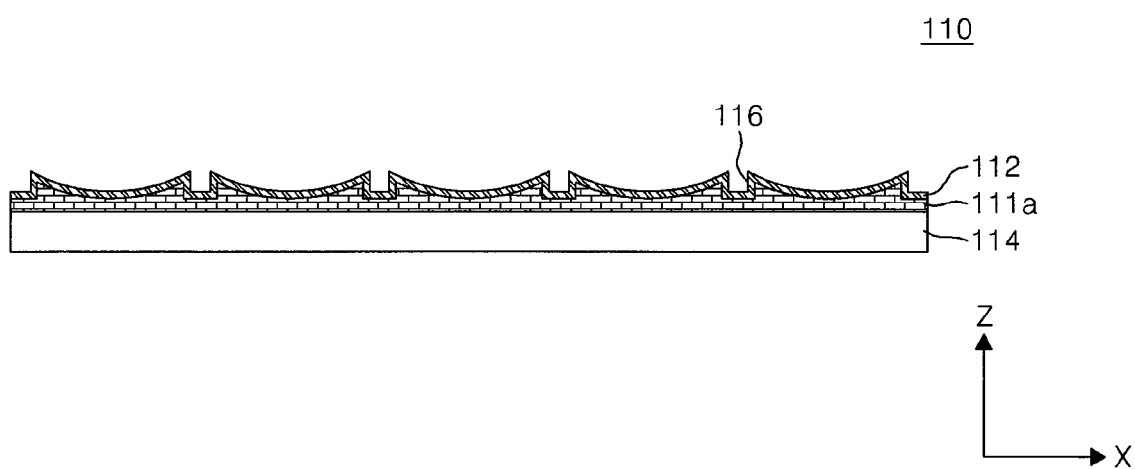

After the concave pattern 111a is patterned, as shown in FIG. 11F, the first electrode 112 of a transparent material is formed on surface of the transparent substrate 114 along the concave pattern 111a. Namely, the first electrode 112 is formed along the optical pattern 111a by depositing an electrode of a transparent material with a thin thickness on the transparent substrate 114 on which the optical pattern is formed.

The process for forming the optical pattern 111a and the first electrode 112 on the transparent substrate 124 and a process for forming the first electrode 112, the spacers 130, and the image display layer 140 on the second substrate 120 may be changeable in order or may be simultaneously implemented.

Figure 11G:
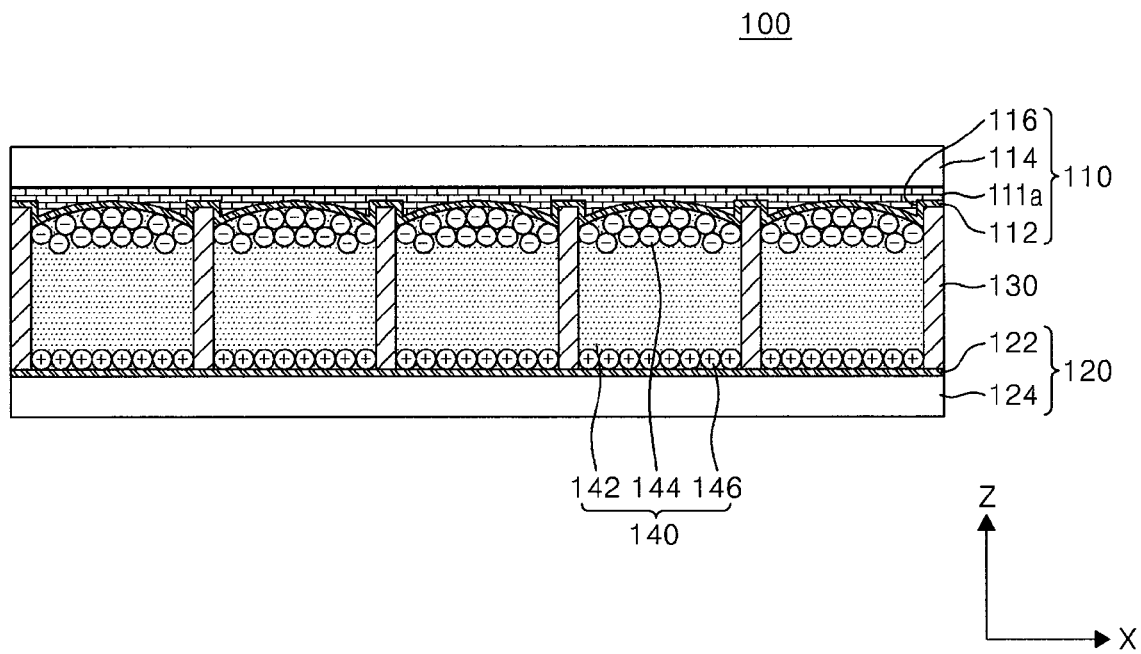

As shown in FIG. 11G, the first substrate 110 is bonded to the second substrate 120 such that the spacer-inserting groove 116 of the first substrate 110 is tightly inserted into a top edge of the spacer 130. By bonding the first and second substrates 110 and 120, the electrophoretic display device 100 is completed.

Although exemplary embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

As described above, the electrophoretic display device of the present invention is formed such that the transparent electrode provided on a display substrate is formed so as to have a curved surface per unit pixel such that frontal reflection of incident light is maximized, whereby it is possible to improve the luminance characteristic even in an identical ambient light environment.

Also, the electrophoretic display device of the present invention is advantageous to adjust the frontal reflection by modifying optical pattern formed on the display substrate.

What is claimed is:

1. An electrophoretic display device, comprising:
a first substrate including a transparent substrate, a pattern layer being formed on the transparent substrate and having a second pattern and a groove, and a first electrode formed along the pattern layer, the first electrode having a first optical pattern, which corresponds to the second pattern, to improve frontal reflectance;
a second substrate opposing the first substrate and including a second electrode;
a spacer interposed between the first and second substrates to define a space between the first and second substrates; and
an image display layer formed in the space defined by the first and second substrates and the spacer to display an image according to an electric field applied between the first and second electrodes,
wherein the first electrode is provided with a spacer-inserting groove corresponding to the groove, into which one end of the spacer is inserted.

2. The electrophoretic display device of claim 1, wherein the first optical pattern is a convex or concave shape.

3. The electrophoretic display device of claim 2, wherein the spacer-inserting groove is formed at a boundary of the first optical pattern.

4. The electrophoretic display device of claim 2, wherein the image display layer includes:
a dielectric fluid filled in the space formed by the first and second substrates and the spacer;
white-colored charged particles dispersed in the dielectric fluid; and
non-white-colored charged particles dispersed in the dielectric fluid,
wherein the white-colored charged particles and the non-white-colored charged particles have different polarities.

5. The electrophoretic display device of claim 4, wherein the dielectric fluid is gas or liquid.

6. The electrophoretic display device of claim 2, wherein the image display layer is electronic liquid powder.

7. The electrophoretic display device of claim 2, wherein the image display layer includes:
a capsule disposed in the space between the first and second substrates and the spacer, the capsule including a dielectric fluid, white-colored charged particles and non-white-colored charged particles,
wherein each of the white-colored charged particles and the non-white-colored charged particles are dispersed in the dielectric fluid and has a different polarity from each other.

8. The electrophoretic display device of claim 7, wherein the capsule has an upper wall curved so as to be fitted to the first optical pattern of the first electrode.

9. The electrophoretic display device of claim 2, wherein the image display layer includes:
a capsule disposed in the spaces between the first and second substrates and the space,
wherein the capsule comprises an electronic liquid powder.

10. The electrophoretic display device of claim 1, wherein the first optical pattern is formed with at least one of concave or convex shapes on a unit pixel basis.

11. The electrophoretic display device of claim 10, wherein the concave shape is at least one of a concave lens shape, a concaved cone shape, or a concaved polygonal pyramid shape.

12. The electrophoretic display device of claim 10, wherein the convex shape is at least one of a convex lens shape, a convex cone shape, or a convex polygonal pyramid shape.

13. The electrophoretic display device of claim 10, wherein the spacer-inserting groove is formed at a boundary of the first optical pattern.

14. A method of fabricating an electrophoretic display device, the method comprising:
depositing an organic layer on a surface of a first substrate;
forming a pattern layer having a second pattern and a groove of the first substrate by patterning the organic layer;
forming a first electrode along the pattern layer, the first electrode having a first optical pattern corresponding to the second pattern and being provided with a spacer-inserting groove corresponding to the groove;
forming a second electrode of a transparent material on a surface of a second substrate;
patterning a spacer on the second substrate;

forming an image display layer on the second substrate; and bonding the first substrate and the second substrate such that the image display layer is interposed between the first and second substrates.

15. The method of claim 14, wherein the forming the optical pattern uses an imprint process or a photolithography process.

16. The method of claim 14, wherein the image display layer is formed by depositing Electronic Liquid Powder in a space formed between the first and second substrates and the spacer.

17. An electrophoretic display device, comprising:
a first substrate including a transparent substrate, a pattern layer formed on the transparent substrate and having a second pattern and a groove, and a first electrode formed along the pattern layer, the first electrode having a first optical pattern corresponding to the second pattern to improve frontal reflectance;
a second substrate opposing the first substrate and including a second electrode;
a spacer interposed between the first and second substrates to define a space between the first and second substrate; and
an image display layer formed in the space to display an image according to an electric field applied between the first and second electrodes,
wherein the first electrode is provided with a spacer-inserting groove, corresponding to the groove into which one end of the spacer is inserted,
the image display layer includes
a capsule disposed in the space between the first and second substrates and the spacer, the capsule comprising a dielectric fluid, white-colored charged particles and non-white-colored charged particles, and
each of the white-colored charged particles and the non-white-colored charged particles has a have different polarity from each other and is disposed in the dielectric fluid.

18. The electrophoretic display device of claim 17, wherein the capsule is formed of a soft material such that an upper wall of the capsule is fitted to the first optical pattern of the first electrode by a press force of the first substrate and the second substrate.

19. A method of fabricating an electrophoretic display device, the method comprising:
depositing an organic layer on a surface of a first substrate;
forming a pattern layer having a second pattern and a groove of the first substrate by patterning the organic layer;
forming a first electrode along the pattern layer, the first electrode having a first optical pattern and being provided with a spacer-inserting groove corresponding to the groove;
forming a second electrode of a transparent material on a surface of a second substrate;
forming a spacer on the second substrate;
forming an image display layer on the second substrate; and
bonding the first substrate and the second substrate such that the image display layer is interposed between the first and second substrates,
wherein the image display layer includes
a capsule disposed in the space between the first and second substrates and the spacer, the capsule comprising a dielectric fluid, white-colored charged particles and non-white-colored charged particles, and
each of the white-colored charged particles and the non-white-colored charged particles have a different polarity from each other and are dispersed in the dielectric fluid.

20. The method of claim 19, wherein the capsule is formed of a soft material such that an upper wall of the capsule is fitted to the first optical pattern of the first electrode by a press force of the fist substrate and the second substrate.

* * * * *